| United States Patent [19]
Harbolt et al.

[11] 4,011,300
[45] Mar. 8, 1977

[54] METHOD OF PRODUCING AMMONIUM POLYPHOSPHATE

[75] Inventors: Bruce A. Harbolt, Northridge; Donald C. Young, Fullerton, both of Calif.

[73] Assignee: Union Oil Company of California, Brea, Calif.

[22] Filed: June 27, 1975

[21] Appl. No.: 591,056

[52] U.S. Cl. .............................. 423/313; 423/310; 71/43; 423/305
[51] Int. Cl.² .................. C01B 15/16; C01B 25/26
[58] Field of Search .................... 423/305, 307–313; 71/43

[56] References Cited
UNITED STATES PATENTS

| | | | |
|---|---|---|---|
| 1,869,688 | 8/1932 | Heimann | 71/43 |
| 1,971,563 | 8/1934 | Hirschkind et al. | 423/310 |
| 3,464,808 | 9/1969 | Kearns | 71/34 |

*Primary Examiner*—Oscar R. Vertiz
*Assistant Examiner*—Gregory A. Heller
*Attorney, Agent, or Firm*—Richard C. Hartman; Dean Sandford; Michael H. Laird

[57] ABSTRACT

Phosphoric acids having $H_2O/P_2O_5$ mole ratios of about 4.5 or less are converted to aqueous solutions of ammonium polyphosphates of which at least about 40 percent of the $P_2O_5$ is present as acyclic polyphosphates. The reaction is conducted at 500° to about 750° F. sufficient to increase the polymeric $P_2O_5$ content at least 10 percent by reacting a highly dispersed, unconfined acid spray with substantially anhydrous ammonia. High conversions to polymeric species are obtained while minimizing both reactor fouling when using impure wet-process acids, and corrosion occurring with either wet-process or "white" acids.

11 Claims, 7 Drawing Figures

METHOD OF PRODUCING AMMONIUM POLYPHOSPHATE

BACKGROUND OF THE INVENTION

The utility and advantage of aqueous ammonium polyphosphate are well known to the agricultural industry. The benefits of high acyclic polyphosphate levels are also recognized. It is often desirable, if not essential, to use merchant grade, wet-process acid feeds due to availability and cost. Wet-process acids are obtained by acidifying phosphate rocks, usually containing calcium phosphates, with strong mineral acids, such as sulfuric acid, which convert the calcium to calcium sulfate releasing phosphoric acid. Insoluble calcium sulfate is separated by filtration.

The merchant grade acid thus obtained is relatively dilute, usually containing less than 55 percent $P_2O_5$. The solutions also contain numerous cogeneric metallic impurities extracted from the source rock including compounds of iron, calcium, aluminum and magnesium. Direct ammoniation of the dilute acids forms unstable ammonium phosphate solutions of low $P_2O_5$ content from which the metallic impurities precipitate, rendering the solutions essentially useless in many applications. This precipitation problem can be substantial in view of the high impurity content of some merchant grade acids.

The ability of polyphosphates to chelate these impurities or otherwise prevent their precipitation is known. It remains, however, to devise an economical process for converting wet-process acids to concentrated ammonium phosphate solutions containing sufficient polyphosphates to prevent precipitation throughout the life of the product.

While long shelf life, i.e., solution stability, is always desirable, it is sometimes essential. For instance, the demand for ammonium polyphosphate, particularly in the agricultural industry, is highly seasonal. As much as 95 percent of the total annual deliveries for some dealers is required within a six-week period, generally during the spring. Obviously, it is very undesirable for such dealers to invest the capital in on-site equipment required to produce the total annual demand in that six-week period. Yet that is precisely what would be required if the stability of the ammonium phosphate product is not sufficient to allow long storage periods. A process capable of substantially improving solution stability would markedly reduce unit size by allowing the operator to run over a greater part of the year and would also increase his flexibility responsive to demand. Moreover, solutions having higher polymeric phosphate concentrations (relative to the total $P_2O_5$ content) are also more able to dissolve and retain even pure solute whereby higher concentrations can be employed. The costs of handling, storing and transporting the product is reduced commensurately. Numerous attempts have been made at developing such a process.

Earlier efforts were directed to the formation of concentrated acid solutions from merchant grade acids by gradual evaporation. Treatment at sufficiently high temperatures produces polyphosphoric acid which, when neutralized under appropriate conditions, forms ammonium polyphosphates. The polymeric species serve to prevent impurity precipitation throughout the process. However, multiple process steps and high heat loads detract from overall economics.

Much effort was made to perfect the direct ammoniation of merchant grade acids taking advantage of exothermic neutralization which can generate sufficient heat to drive water from the liquid phase and produce polyphosphates. Investigators pursuing this approach found that conditions sufficient to obtain high polyphosphate levels also produce cyclic metaphosphates that accumulate as fouling deposits on hot contact surfaces. One approach involves the so-called pipe or jet reactors in which the acid and ammonia are contacted in a confined tubular reaction zone under conditions sufficient to concentrate and polymerize the phosphate. Temperatures on the order of 500° F. and up have been employed for this purpose. The published results of many of these endeavors indicate that the deposit accumulation rate on interior reactor walls is so great that such length and process economics suffer substantially. Fouling rate increases with reaction temperature and can become so severe that continuous operations can not be maintained for more than two hours without removing and re-working the reactor tube.

The severity of the problem and continuing interest in its solution are evidenced by more recent work on reactor fouling. For instance, fouling prevention by addition of urea to the reactor feed is suggested in U.S. Pat. No. 3,723,086. Other investigators have suggested the use of cold wall reactors believing that lower wall temperature would reduce deposit accumulation. These efforts have been successful to varying degrees. However, reactor wall cooling also reduces reaction temperatures which, in turn, limit polyphosphate content.

Moreover, the question of reactor fouling is not a one-sided issue. In fact, most previous investigators readily discovered that the accumulation of fouling deposits on the reactor interior is their only weapon against extremely rapid corrosion. Phosphoric acids, even at the concentrations found in merchant grade acids, corrode and dissolve essentially all known metals and alloys as well as glass and ceramics often used as reactor liners at temperatures above 500° F. Yet, as described hereinafter, those temperatures must be obtained to produce significant polyphosphate levels. Thus, presently available processes, in order to operate effectively for any significant period, would have to control the reactor fouling rate at a level such that corrosion is avoided while excessive reactor fouling and plugging do not occur. Processes capable of maintaining that balance are not available.

Moreover, this benefit of reactor fouling is not even available with the more pure "white acids". The white acids contain at most insignificant amounts of foulant producing materials. The available batch or tubular reactors can not operate on white acid feeds for this reason.

The so-called white acids are obtained in the "electric furnace" process in which phosphate-containing rock is reduced by reaction with coke at extremely high temperatures generated by electric current. The phosphate is reduced to elemental phosphorus, burned to $P_2O_5$ and absorbed in water. While these acids are generally more expensive than those obtained from the wet-acid process, they often become available at prices low enough to justify their use in fertilizer manufacture due to regional over production. However, for the reasons mentioned above, these acids are not suitable for tubular or batch neutralization. They do not form deposits sufficient to protect reactor internals with the consequence that corrosion rates are exceedingly high. Our process allows the use of any acid feed, regardless of impurity level, including wet-process, white, or combinations of these or other acids.

As discussed hereinafter in more detail, maximum polymer content is limited essentially by maximum reactor temperature, assuming equilibrium is obtained. Maximum temperature, in turn, is limited by the feed water content, i.e., the $H_2O/P_2O_5$ ratio. Thus, while reactor wall cooling may, to some extent, eliminate the problem of reactor fouling, it also reduces product quality.

It is therefore one object of this invention to provide a method of producing stable ammonium phosphate solutions from either wet-process or white acids. Another object is the provision of an improved method for the direct neutralization of these acids with ammonia which makes maximum use of the autogenous heat of neutralization. Another object is the conversion of merchant grade wet-process acids containing cogeneric metallic impurities to stable aqueous ammonium phosphate solutions in which at least about 40, and preferably at least about 50 percent of the phosphorous is present as acyclic polyphosphates. Another object is the provision of a method for the production of stable, concentrated ammonium phosphate solutions in which at least 40 percent of the phosphorous occurs as nonorthophosphoric species from relatively pure white acid feeds while minimizing the reactor corrosion.

Therefore, in accordance with one embodiment, phosphoric acids having $H_2O/P_2O_5$ mole ratios of about 4.5 or less are converted to stable, aqueous ammonium polyphosphate solutions of which at least about 40 percent of the phosphorous determined as $P_2O_5$ is present as acyclic polyphosphates. This is accomplished by spraying the acid downwardly into an unconfined reaction zone to produce a highly dispersed, discontinuous liquid acid phase, and reacting substantially anhydrous ammonia with the acid spray. Reaction conditions are controlled to obtain a liquid phase temperature of about 500° to about 750° F. The reacted acid spray is then quenched to a temperature below about 200° F. in an ammonium polyphosphate solution.

The unconfined reaction zone reduces or completely eliminates the effects of fouling deposit accumulation on reactor internals. It is advisable to surround the entire reaction system in a substantially gas tight vapor housing of relatively large internal diameter to prevent air induction and escape of ammonia, acid and reaction products. Nevertheless, the reaction takes place almost exclusively, is not exclusively, in an unconfined, highly dispersed, discontinuous liquid phase. This is accomplished by producing a dispersed liquid spray within a relatively large chamber and directing the spray downwardly into the quench zone such that 20 percent or less of the acid medium contacts the container walls. Thus, heat transfer through the reactor walls does not account for any substantial heat loss as regards a reaction medium per se, i.e., the liquid acid droplets. The housing walls remain relatively cool compared to the hot acid reaction phase and are contacted with little if any of the liquid phase. Foulant accumulation is minimized or eliminated. Corrosion rate is significantly reduced, even with non-fouling "white" acids due to low wall temperatures on the order of 400° F. or less. Reduced wall temperatures do not detract from conversion level in this system since the required conversion to polymer has already occurred in the liquid phase before contact, if any, with the reactor walls. We have discovered that extremely high reaction rates can be obtained in highly dispersed acid phase by this procedure rates capable of producing the required conversion in a very short time span, less than that required for the acid spray to travel either to the vapor housing or quench.

Some investigators have suggested that the degree of some problems associated with tubular reactors might be reduced by injecting ammonia at high mass rates and/or velocities. While this remedy might have some benefits, it introduces additional complications due primarily to the vast dissimilarity in the physical properties of the two phases — acid and ammonia. Even at the elevated temperatures required in this reaction, the acid phase, and the ammonium phosphate or polyphosphate melt, are extremely viscous. Accordingly, ammonia injection at high velocities results in two separated, yet continuous phases, with the acid phase clinging to the flowing along the interior reactor walls while the ammonia gas passes directly through the tube. In straight reactor tubes this phenomenon results in low ammonia conversions and incomplete acid conversion. Very little acid surface is exposed to the ammonia gas. Secondly, the acid or partially neutralized melt at the acid-gas interface, may be subject to high shear, and may even be literally blown out of the reactor before complete conversion can take place.

We considered that the formation of two discrete continuous phases might be overcome with a reactor tube having one or more sharp angles or bends, or one provided with baffles to promote acid-ammonia mixing. Very little if any mixing would result from this procedure due to the vast difference in viscosity of the liquid and gas phases. Moreover, this approach would definitely result in increased reactor fouling and/or corrosion due to exposure of even higher internal surface (baffles), or erosion or protective foulant deposits from the angular parts of the reactor tube.

For instance, this type of erosion-corrosion is known to result in the ordinary pipeline transport of phosphoric acids due to the removal of protective phosphate film in high turbulence zones. However, in the absence of such turbulence in a tubular reactor, low conversions of both ammonia and acid will result without relatively long contact times, e.g., long reactor tubes. The gas phase will pass quickly through the reactor while the acid, travelling in a continuous liquid phase is subject to little radial mixing due to its extremely high viscosity. In fact, the acid at the acid-reactor interface may never come into direct contact with the ammonia gas.

The continued attempts to perfect confined liquid phase reaction systems, such as pipe reactors, is understandable in view of the belief that the reaction should be contained in a relatively small volume to promote adequate mixing and retain the heat required to produce the high temperatures necessary for high conversion to polyphosphates. It was not apparent that these temperatures could be obtained in a highly dispersed, discontinuous liquid phase. Under these circumstances the reaction phase — the liquid spray — presents such a high external surface area that heat exchange between the reaction phase and ambient ammonia gas would increase, thereby lowering reaction temperature. However, while heat transfer rate undoubtedly increases with surface, we have found that the required temperatures can still be obtained.

The reasons for the success of this procedure are not known with certainty, although it is possible that the reaction rate is increased sufficiently by the exposure of the higher surface area to provide reaction rates within the acid droplets high enough to generate heat at a rate greater than it is transferred to the immediate environment, thereby allowing attainment of the required temperatures. The attainment of high temperatures in the acid droplets may involve the formation of a heat transfer barrier or inhibiting film at the drop surface due to characteristics of either the original acid, the reaction products or some intermediate form thereof.

However, it is also apparent from our successful operations that the presence of some type of heat transfer barrier at the droplet periphery, if it does occur, does not reduce the ammonia transfer rate to an extent sufficient to prevent the high neutralization rates and temperatures required for polymerization.

High ammonia transfer rates must be maintained to obtain sufficient liquid phase temperature while avoiding excessive heat loss of the liquid droplets to the environment. A critical factor in this regard is the $H_2O/P_2O_5$ ratio of the feed as it enters the reaction zone. Substantially anhydrous ammonia is also required. The presence of water in the ammonia gas influences reaction kinetics and conversion in a manner essentially identical to variation of the $H_2O/P_2O_5$ feed ratio. Thus, the amount of water contained in the injected ammonia gas should also be taken into account in determining that ratio.

It was not apparent that parameters could be found or adequately controlled to maintain this essential balance. For instance, Y. A. K. Abdul-Rahman and E. J. Crosby observed the formation of an impervious crust upon treatment of phosphoric acid droplets with ammonia. Their results are reported in "Direct Formation of Particles from Drops by Chemical Reaction With Gases", Department of Chemical Engineering, University of Wisconsin, Madison, Wisconsin, appearing in Chemical Engineering Science (1973), Vol. 28, pages 1273–1284. The efforts of these authors, as indicated by the title of their work, was directed to the formation of solid droplets of ammonium phosphate. While their investigations were carried out at temperatures far below those required to promote polymerization, and at contact times far exceeding those possible in apparatus of the type described herein, they did observe several phenomena which appeared to negate the utility of this process. These included the rapid formation of a crust surrounding the droplets, the attainment of only very low temperatures even with anhydrous ammonia, and the actual explosion of the droplets in some cases due to containment of vaporized water by the ammonium phosphate crust.

We have discovered that the formation of such mass transfer barriers must, and can be prevented. However, the prevention of that phenomenon requires that the reaction rate within the droplets be sufficiently high to reach temperatures in excess of the ammonium phosphate melting point prior to the occurence of any significant crust formation at the droplet's periphery. This can be accomplished in our process. While a number of variables are doubtlessly involved to different extents, the most significant factors are probably the $H_2O/P_2O_5$ feed ratio and adequate liquid phase dispersion. If the ratio of water to phosphate exceeds the maximum of 4.5 $H_2O/P_2O_5$, more preferably 3.3, droplet temperature can not be elevated to the point required to obtain in excess of 40 percent polymeric species in the product, and can not be elevated at a rate sufficient to reach the ammonium phosphate melting point prior to the formation of crusts at the particle periphery. Finally, assuming that temperatures above the water boiling point could be achieved in these more dilute systems, the pressure buildup due to the generation of the steam in the particle interior would result in the particle fragmentation as observed by Abdul-Rahman et al.

While numerous other embodiments and variations of these systems will be apparent from the principles disclosed, one embodiment bears particular mention. The necessity of producing a highly dispersed acid phase has been pointed out. However, the degree of dispersion obtainable by any given spray means is at least in part a function of feed acid viscosity. Thus, as the viscosity of the feed increases, the degree of dispersion is reduced. Upon observing this occurrence and its effect on controlling parameters, we discovered that adequate dispersion can be maintained even with highly viscous acid feeds without equivalent fouling by heating the feed to a temperature between about 250° and about 600° F. With wet-process feeds, temperatures substantially above this level should be avoided to prevent cyclic metaphosphate production and apparatus fouling upstream of the reactor or within the acid spray means itself. While there is, of course, no precise feed acid viscosity above which feed preheating should be employed, this embodiment is particularly beneficial for use with feeds having viscosities in excess of about 4000 centipoise at 80° F.

The several embodiments of this invention and the factors and principles involved in their successful operation will be more apparent from the accompanying drawings of which FIG. 1 is a graphical representation of the percent conversion of feed acid to polymeric phosphates as a function of temperature;

Figure 1:
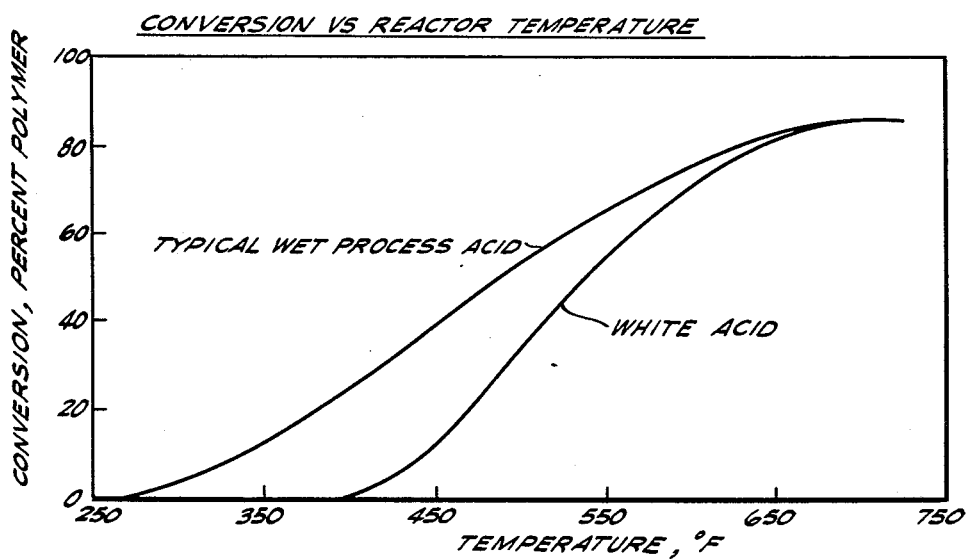

FIG. 1 illustrates the effect of reaction temperature on conversion determined as the percent acid in polymeric, i.e., non-ortho form, at equilibrium. The illustration is based on a typical wet-process acid containing about 10 weight percent impurities. While equilibrium is a condition difficult to obtain in a continuous process of this nature, conversions within 90 percent of equilibrium at any given temperature can be readily obtained by our process.

As illustrated in FIG. 1, the lower end of the temperature range envisioned in this process, about 500° F., corresponds to a conversion of the typical acid of about 53 percent. Detectable amounts of deposit-forming metaphosphates are produced even at 50 percent conversion. Thus these methods are beneficial even at that level.

Figure 2:
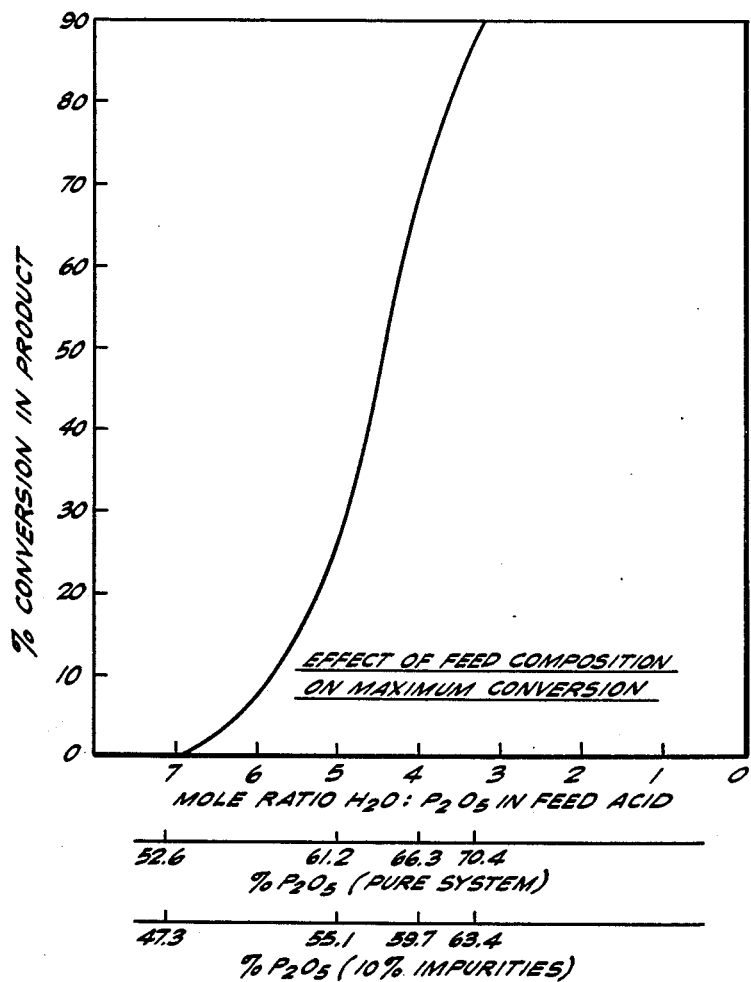
FIG. 2 is a graphical representation of percent conversion to polyphosphates as a function of feed $H_2O/P_2O_5$ molar ratio.

FIG. 2 illustrates the influence of $H_2O/P_2O_5$ feed ratio on ultimate conversion in a "perfect" batch reactor system under adiabatic conditions in the absence of mass transfer limitations. As already mentioned, equilibrium is difficult to reach in a continuous system. Similarly, while adiabatic operation can be closely approached and the influence of mass transfer can be markedly reduced by these methods, we presently believe that the maximum efficiencies obtainable in flow systems are on the order of about 80 to 90 percent. Thus the maximum conversion obtainable with a feed having a given $H_2O/P_2O_5$ ratio would be approximately 10–20 percent less than that illustrated in FIG. 2. Conversely, the $H_2O/P_2O_5$ feed ratio required to allow a predetermined maximum conversion in an actual flow reactor would be somewhat less than the corresponding value illustrated in FIG. 2. From a practical standpoint the threshold conversion level of 40 percent, above which the fouling is known to occur with wet-process acids would require a feed acid having an $H_2O/P_2O_5$ ratio of approximately 4.5.

Suitable feed acids will have $H_2O/P_2O_5$ mole ratios on the order of about 4.5, preferably about 3.3 or less. The value of about 4.5 corresponds to an impurity free $P_2O_5$ content of approximately 63 weight percent $P_2O_5$. $H_2O/P_2O_5$ ratios of 3.0 correspond to orthophosphoric acid contents of 100 percent on an impurity-free basis. This is not to say that a value of 3.0 represents the minimum $H_2O/P_2O_5$ ratio applicable in these procedures. On the contrary, feeds containing polymeric acid and having $H_2O/P_2O_5$ ratios below 3.0 can be used. Polymeric acid might be present in the feed as obtained or might occur as a consequence of preconcentration and/or the thermal pretreatment to reduce feed viscosity. However, as a general rule, it is preferable to employ acid feeds in which less than 40, preferably about 30 percent or less of the $P_2O_5$ is present as non-ortho, i.e., polymeric phosphate.

Suitable feeds can also contain substantial amounts of ammonium phosphates. These materials can be present in the feed as required or can be introduced by partial neutralization of the acid prior to ejection into the reactor. Pre-neutralization, taking advantage of the autogenous heat of neutralization, might be employed to raise feed temperature, reduce viscosity and improve liquid phase dispersion and distribution in the reactor.

The wet-process acids contain at least about 1, usually at least about 5, and generally between about 2 and about 20 weight percent metallic impurities. The great majority of these impurities are soluble metal compounds of iron, aluminum, calcium and magnesium including sulfates, nitrates, halides, phosphates and hydrogen phosphates.

For several reasons the acid feed is preferably relatively warm when injected into the spray reactor. Feed temperatue should be at least about 50° F., preferably at least about 100° F., and, with highly viscous feeds, temperatures on the order of 200° to 500° F. are preferred. Higher temperatures reduce viscosity, increase acid dispersion and distribution, and reduce droplet size. In fact, substantial advantage is realized by heating the feed acid, regardless of initial viscosity. Preheating also reduces the reactor heat load required to elevate liquid phase temperature. However, this factor is of only minor significance in view of the nominal heat required to increase liquid phase temperature as opposed to the latent heat of vaporization involved in expelling water from the liquid reaction phase.

Either purified wet-process acid or the so-called white acids containing less than one weight percent metallic impurities can also be employed. Any of these acids can also contain substantial amounts of polymeric phosphoric acid or ammonium phosphates. From a standpoint of conversion, i.e., product polymer content, it is essential to this invention only that reaction conditions, primarily liquid phase temperature, be sufficient to increase polymer content by 10 percent of the total $P_2O_5$ present. However, it is presently preferred, and in fact it is most often essential to employ feeds containing less than 40 and generally less than 30 weight percent polymeric $P_2O_5$.

The ammonia feed should be substantially anhydrous and should contain less than about 5 and preferably less than about 1 weight percent water. As a rule of thumb, the ammonia should be introduced at a temperature above its dewpoint. Dewpoint increases significantly at a water level of about 1 weight percent. Moreover, it must be observed that liquid water introduced from any source increases the reactor heat load and inhibits polymerization to an extent comparable to that observed by introduction of a similar amount of water with the acid feed per se.

The ammonia is introduced into the spray reactor as a vapor although it can be obtained from a liquid ammonia supply source and vaporized in route to the reactor by well known procedures. While elevated ammonia temperatures are preferred, i.e., on the order of 80° F. or higher, they are not essential in view of the minor effect on overall heat balance.

Figure 3:
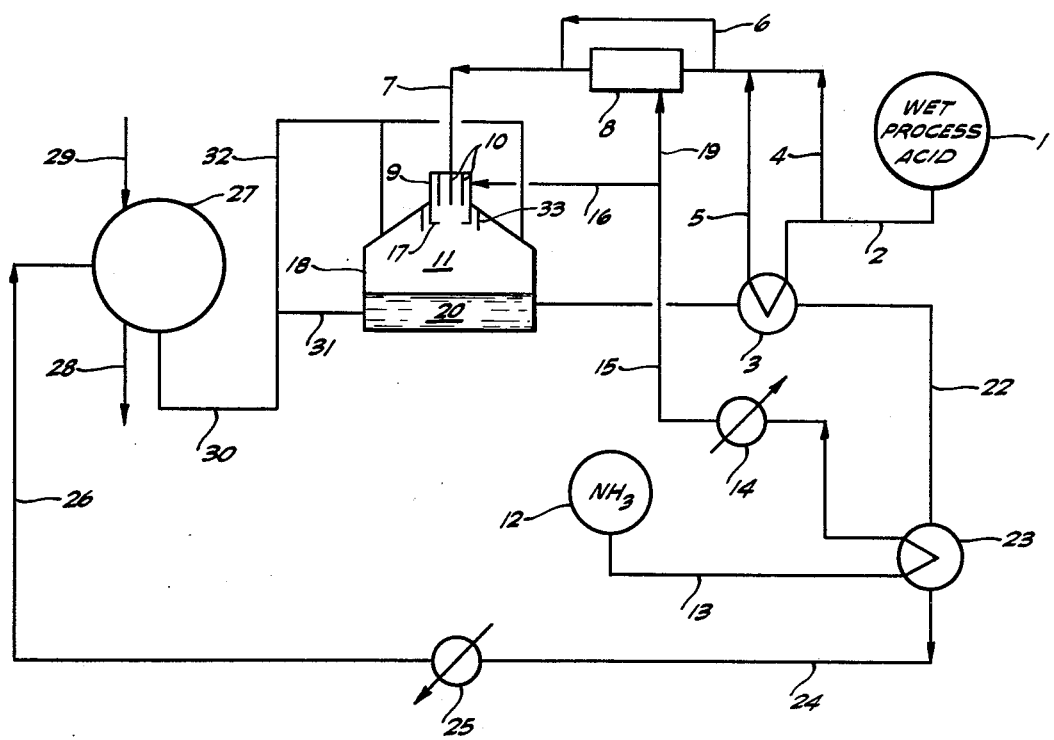
FIG. 3 is a schematic flow diagram of one polymerization system envisioned within the concept of this invention.
Figure 7:
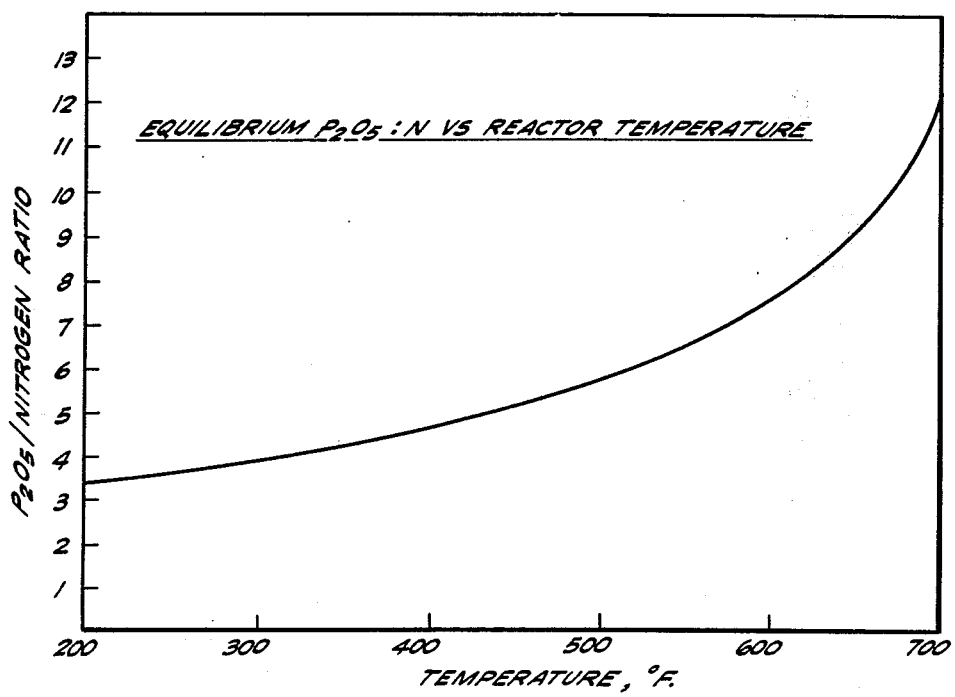
FIG. 7 is a graphical representation of the $P_2O_5$:nitrogen ratio in the liquid reactant phase prior to quench at equilibrium as a function of liquid phase temperature.

One of the many alternative process schemes made possible by these concepts is illustrated schematically in FIG. 3. Feed acid can be passed directly from reservoir, pipeline or other container 1 directly to the reaction zone through lines 2, 4, 6 and 7 to acid-spraying means 9. In most applications, however, it is preferable to at least partially preheat the acid, at least by indirect heat exchange with hot product effluent. Thus the feed may be passed through indirect heat exchanger 3 and lines 5, 6 and 7 as before. In an alternative embodiment, either a portion of all of the acid may pass through pre-neutralizer 8 and contacted with ammonia entering via line 19. Ammonia ddition rate to neutralizer 8 should be sufficient to only partially neutralize the acid feed and increase its temperature to a level in the range of about 200° to about 500° F. Production of more than 40 weight percent polymer by pre-neutralization or other means upstream of the reactor is preferably avoided.

Even more importantly, however, the amount of neutralization occurring in neutralizer 8 should not be so great as to prevent the possibility of obtaining the high reaction temperature in reaction zone 11 required to produce the desired degree of polymerization. Thus it is presently preferred that the amount of ammonia introduced into neutralizer 8 be below about 0.1, preferably below about 0.05 weight parts ammonia per weight part $P_2O_5$. Of course temperatures above about 200° F. in pre-neutralizer 8 would require the use of pressure control systems, pumps and valves not illustrated. It is also preferred that sufficient pressure be maintained on the system at that point to prevent steam flashing from the liquid phase within the process lines prior to the ejection of the feed acid from nozzle 9.

Ammonia can be obtained either as a gas or liquid from a tank or pipeline 12 and passed to the reaction zone through nozzle 9 directly through lines 13, 15 and 16 and intermediate heat exchanger 23 and heater 14. Depending on the ammonia storage conditions, heat exchangers 23 and heater 14 may or may not be required. However, in the event that ammonia is obtained as a liquid, sufficient heat should be added to completely vaporize the ammonia prior to ejection into the reaction zone.

The ammonia injection rate should be controlled in proportion to the acid feed rate to obtain the highest liquid phase temperatures in zone 11. This amount generally corresponds to about 60 percent of the total ammonia required for complete neutralization. Due to equilibrium it also corresponds generally to the maximum amount taken up by the acid at the temperatures prevailing in the reaction zone. However, for purposes of convenience, it may be desirable to add to the reactor the total amount of ammonia desired in the final product. Excess ammonia will reduce reaction temperature, but only to a very minor extent, and will be readily absorbed in the product quench. However, ammonia injection rates substantially above those required to completely neutralize the acid product are of little or no benefit and serve only to increase product pH. Accordingly, the total ammonia injection rate, including the minor amount added to pre-neutralizer 8, if any, should be at least about 0.12 and is generally within the range of 0.12 to about 0.40 weight parts ammonia per weight part $P_2O_5$. For instance, 0.35 weight parts ammonia per weight part $P_2O_5$ is required to produce 10-34-0.

While the total ammonia required for neutralization can be added to the reactor, maximum reaction temperatures are obtained generally by adding about 40 to about 70 percent of this amount to the reactor and injecting the remainder elsewhere in the system such as to quench zone 20, product and recycle lines, accumulator 27, or the like. For instance, when producing 10-34-0, the highest liquid phase temperatures and consequently the highest degrees of polymerization are obtained by adding approximately 60 percent of the stoichiometric ammonia to the reactor. This corresponds to approximately 0.21 weight parts ammonia per weight part $P_2O_5$.

Figure 4:
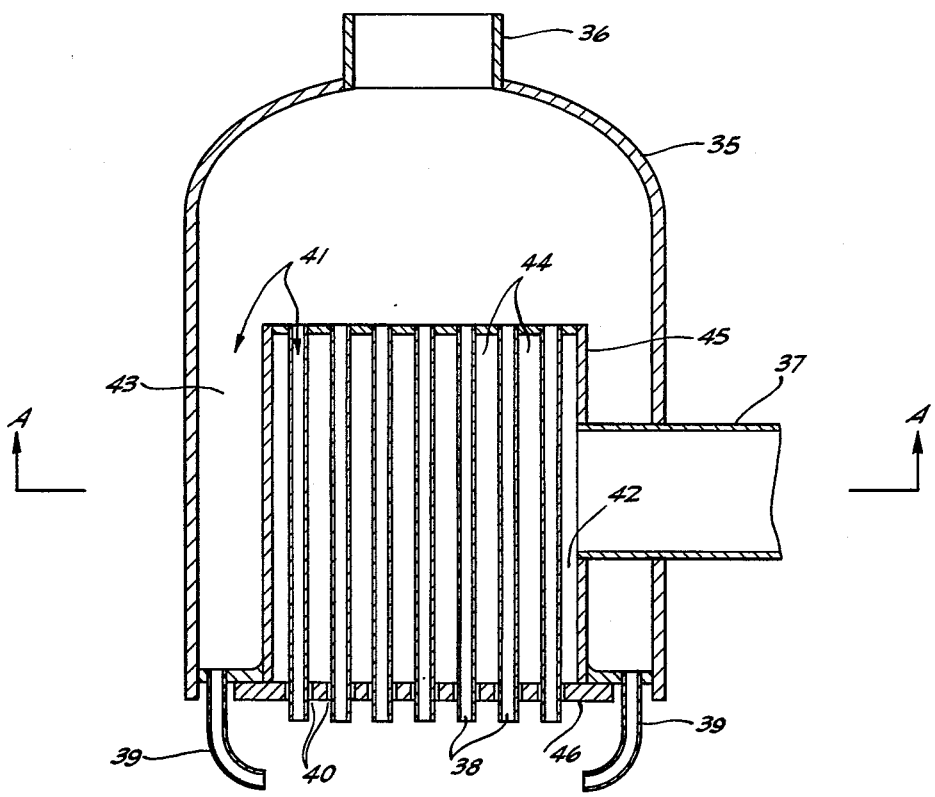
FIG. 4 is a side-sectional view of one acid-ammonia spraying means.

Ammonia mass rate must also be taken into account in the design and operation of ammonia jets such as 8 and 39 illustrated in FIG. 4. Concentrated phosphoric acids such as the feeds described herein are generally very viscous materials. Therefore, the amount of energy required to adequately disperse the liquid feed would be extremely high in the absence of any supplemental dispersing effect. This effect is obtained in the process of this invention by injecting ammonia at high velocities into the acid spray. It is therefore particularly preferred that at least a substantial proportion, e.g., at least about 30 percent of the ammonia be introduced as a high velocity stream directed radially inwardly into the acid spray from around the periphery of the acid spray at a velocity having a radial vector into the acid of at least about 200, usually at least about 500, and preferably at least about 1000 feet per second. This manner of ammonia injection accomplishes several functions the most significant of which include increased liquid phase dispersion and subdivision, directional control and shaping or containment of the liquid spray within the unconfined reaction zone 11.

Figure 6:
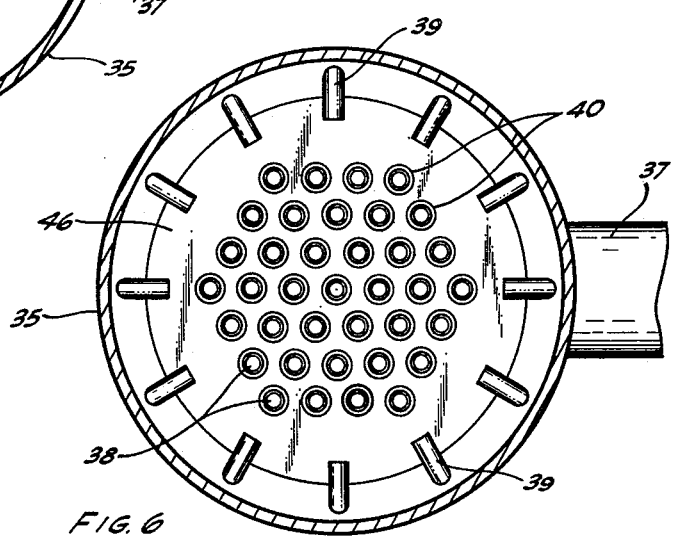
FIG. 6 is a bottom view of the spraying means illustrated in FIGS. 4 and 5.

Depending on the reaction temperature in the dispersed liquid phase, some of the ammonia feed may not absorb in the acid droplets but will be absorbed in quench medium 20. Equilibrium ammonia content is a function of temperature as illustrated in FIG. 6. This FIGURE graphically represents the influence of temperature on $P_2O_5$/nitrogen weight ratio. The amount of nitrogen combined with phosphate at equilibrium conditions may be established exactly in the dispersed liquid droplets the ratios of nitrogen to phosphate will approach equilibrium and will correspond approximately to the values illustrated in FIG. 6. Thus, depending on liquid phase temperature, it may not be possible to form diammonium phosphates in zone 11, assuming that product is desired. Additional ammonia — the amount beyond the level absorbed in zone 11 — can be added to the reaction zone and absorbed in the quench, but is preferably added to the recycle system or product accumulator to minimize reaction phase cooling.

Feed acid is injected from spray means 9 through one or more acid spray means 10 which can be any one of the numerous known apparatus elements for producing dispersed liquid sprays such as nozzles, orifices, jets, or the like. The acid is thus sprayed downwardly into unconfined reaction zone 11 where it is intimately contacted with and dispersed by ammonia introduced by nozzles or jets 17. A suitable spraying means is illustrated schematically in more detail in FIGS. 4, 5 and 6, discussed hereinafter.

Although the entire reaction system should be contained in a housing 18, the great majority of the liquid spray will pass downwardly into aqueous quench 20 without contacting the interior walls of vapor housing 18. This housing is preferably a substantially gas-tight enclosure having a relatively wide internal diameter of at least about 2 feet, preferably at least about 4 feet, containing the ammonia-acid jet 9 and aqueous quench 20 as illustrated in FIG. 3. The height of enclosure 18 should be sufficient to provide a vertical distance between acid spray means 10 and the upper surface of quench 20 sufficient to allow adequate reaction, temperature, elevation and polymerization. We have found that the reaction is extremely rapid in these systems and will go to completion in less than 2 seconds and generally less than 1 second. Thus the distance between the ammonia-acid jet or jets and product quench 20 should be at least about 1, preferably at least about 2, and is generally at least about 4 feet. Furthermore, to minimize or completely eliminate the contact of dispersed acid droplets with the interior surfaces of housing 18, is it presently preferred that the ratio of the vertical distance between the acid spray and the aqueous quench to the internal diameter of housing 18 be less than about 5.

The extremely short reaction times made possible by this process are far less than those required to obtain comparable conversions by previous methods, e.g., confined tubular reactors. While the identity and influence of all the factors leading to this distinction between our process and alternative procedures are not known with certainty, it may be that the mass transfer limitations involved in the confined liquid phase systems so inhibited reaction rate, and thus the rate of temperature elevation, that substantially longer contact times were required to obtain comparable conversions. Whatever the reasons, however, the fact remains that much shorter contact times are required in these processes. Undoubtedly, the extended periods of contact required in the confined prior art systems accentuate the problems of reactor fouling and corrosion.

The reactor system can also be provided with a baffle or shroud means 33 surrounding the acid spray and ammonium injection means 10 and 17, respectively. This shroud does not contain the acid spray per se. On the contrary, it momentarily contains the high velocity ammonia gas thereby increasing turbulence in the initial stages of the ammonia-acid interaction. Acid dispersion and surface area are increased while droplet size is reduced, thereby increasing reaction rate. Furthermore, by directing the flow of ammonia and expelled steam downwardly into quench 20, baffle 33 also serves to guide the acid spray droplets in the same direction thereby avoiding substantial contact of those materials with the inside surfaces of housing 18.

For the reasons mentioned above, however, the shroud or baffle means 33 should not be of such length or internal diameter as to significantly confine the acid spray itself. Thus the shroud should have a substantially vertical longitudinal axis aligned with the axis of acid spray means 10. It should be completely open at its lower extremity and have a length of about 4 feet or less, preferably about 2 feet or less with a ratio of length to minimum internal diameter of about 10 or less, generally about 5 or less, and preferably less than 3.

Even though the acid is ejected from spray means 10 at relatively high velocity, the reaction between the ammonia and acid is complete within 3 feet, generally within 2 feet, of the spray nozzle. Reaction rate is sufficient to create temperatures of at least 500° F., generally between 500° and 750° F., and preferably between about 550° and 700° F. in the acid droplets in unconfined reaction zone 11.

Reaction rate is determined by a number of factors including droplet size, ammonia concentration (water content), reactor pressure, feed acid and ammonia injection temperature and velocity, feed acid $P_2O_5$ concentration and incident impurity level, and the ambient gas temperature in unconfined reaction zone 11. The influence of most of these variables is completely overshadowed by the affects of droplet size, feed acid $P_2O_5$ content and ammonia purity.

As mentioned above, substantially anhydrous ammonia should be employed. While superatmospheric pressure can be used, they are not required to obtain the desired conversions. Both operating and capital cost can be minimized by operating at ambient conditions. In fact, we have observed that a slight vacuum is actually created within vapor confinement housing 18 presumably due to the rapid absorption of ammonia in the acid spray and quench 20. The affect of $H_2O/P_2O_5$ feet ratio is discussed above.

The remaining variable — acid spray efficiency or spray droplet size — is determined by several variables which are also well known in the art. For instance, a detailed description of the variables involved in producing liquid sprays or mists is found in Kirk-Othmer, *Encyclopaedia of Chemical Technology*, 2nd Edition, Vol. 18, Interscience Publishers (1969), pages 634–653. A Bibliography giving reference to the work of numerous investigators in this field is also included. The article refers to numerous forms of liquid spraying and atomizing equipment known to the art which are suitable for use in this invention.

Figure 5:
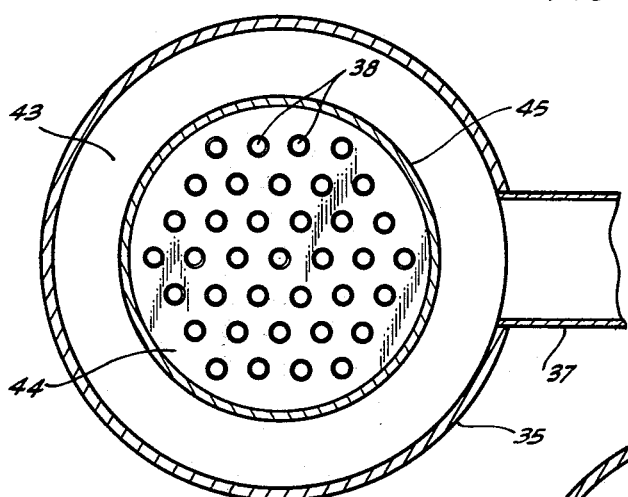
FIG. 5 is a transverse sectional view taken along section A—A' in FIG. 4.

It is presently preferred, however, that the spray forming means comprise a system in which the ammonia and acid enter the reaction zone through separate lines as illustrated in FIG. 3 although these separate lines can be contained in the same housing, nozzle or spray means. This qualification is essential to the concept herein described in that any degree of reaction between the ammonia and acid in a confined space such as in a reactor line, pipe reactor or closed mixing nozzle, sufficient to produce a temperature above 500° F. will cause fouling of the line, nozzle or the like. Thus the major amounts of ammonia and acid should be injected from separate orifices. In addition, the cooperation of the ammonia and acid spray means should be such that neutralized or partially neutralized hot acid spray, e.g., 500° F. or higher, is not directed onto the ammonia nozzles. An apparatus of this type is illustrated in FIGS. 4–6 wherein the annular and peripheral ammonia injection means are positioned relative to each other such that the hot neutralized acid does not contact the ammonia injection means or other solid surface of the spray apparatus. In this manner the nozzles or jets are not heated by a hot reaction mixture, and they are cooled internally by incoming feed. Thus they do not present a hot surface for the formation and accumulation of fouling deposits.

The principal factors controlling acid distribution and spray droplet size include acid feed velocity, viscosity and nozzle size and design, i.e., Reynolds number, ammonia mass flow rate relative to the acid flow rate, ammonia velocity upon contact with the acid spray, and the position of the ammonia jets, orifices, etc. relative to the acid jets and spray. Droplet size can be reduced by reducing feed acid viscosity at the acid orifice, increasing the velocity of the acid and/or ammonia streams, increasing the relative ammonia mass flow rate, increasing the acid orifice Reynolds number, and positioning the ammonia jets in close proximity to the acid nozzle aligned in a manner to provide a substantial radial component of the ammonia stream relative to the acid stream. One or more of these variables can be adjusted to promote the desired reaction conditions as indicated by liquid phase temperature and/or conversion to polymeric phosphates. As indicated above, a product containing at least about 40 percent polyphosphate species should be obtained.

Conversion can be readily determined by simply catching a sample of the ammonium polyphosphate melt before it contacts the aqueous quench. The polymeric species in the melt are stable, even at elevated temperatures, if isolated from substantial moisture. Thus the dispersed reaction product can be sampled, retained in a sealed container and analyzed to determine the conversion level.

Similarly, liquid phase reaction temperature can be approximated by positioning a temperature-sensing device such as a thermister, thermocouple or the like within the acid spray at one or more elevations to determine the maximum temperature obtained within the unconfined reaction zone.

Returning now to FIG. 3, the ammonium polyphosphate melt is passed directly into quench 20 at a temperature sufficient to minimize hydration and depolymerization. This temperature should be less than about 200° F., preferably below about 150° F. The quench medium pH can be between about 5.5 and about 8.5 although product solubility is highest under slightly acidic conditions. Thus pH levels between about 5.5 and about 6.8 are presently preferred. Recycle is controlled at a rate sufficient to rapidly quench the product melt and corresponds to a volumetric recycle ratio of at least 10, preferably between about 20 to about 60.

Quench medium 20, containing the dissolved ammonium phosphate reaction product, is passed by lines 21, 22, 24 and 26 through heat exchangers 3 and 23 and cooler 25 to product accumulator 27. Additional ammonia required to produce the desired product, e.g., 10-34-0, can be added either in the reaction zone or at any point in the recycle system. Makeup water is added as required to accumulator 27 via line 29 or other means as required to obtain the desired concentration and product is withdrawn via line 28.

FIG. 4 is an enlarged side-sectional view of nozzle assembly 9 illustrated schematically in FIG. 3. This FIGURE illustrates only one of numerous possible ammonia-acid mixing means suitable for this purpose. The nozzle assembly comprises housing 35 having ammonia inlet 36 and acid inlet 37. The interior of the assembly comprises a plurality of axially aligned tubes 38 through which ammonia passes as illustrated by arrow 41. Ammonia also passes through annular space 43 and through nozzles 39 spaced circumferentially around nozzles 38 whereby ammonia is ejected radially inwardly from around the circumference of the jet.

Acid enters the system through inlet 37 indicated by arrow 42 and into interstitial spaces 44 in shell 45 defined by the exterior surfaces of tubes 38. A bottom view illustrating the relative positioning of tubes 38 and acid-containing shell 45 is provided in FIG. 5 which is a bottom sectional view along section A—A of FIG. 4.

FIG. 5 illustrates that acid shell 45 completely surrounds the continuous volume 44 through which tubes 38 pass, thereby allowing passage of ammonia through the acid volume. Acid is emitted through annular orifices 40 defined by the external surface of tubes 48 and the lower face 46 of housing 35. Thus, in operation, acid is ejected from annular orifices 40 in a downwardly direction while ammonia is ejected into the interior of the acid spray through nozzles 38 and radially into the spray from circumferential nozzles 39.

FIG. 6 provides a bottom planar view of the apparatus illustrated in FIGS. 4 and 5 showing the relative positioning of circumferential ammonia nozzles 39, acid inlet 37, internal ammonia jets 38, annular acid nozzles 40 and housing 35.

EXAMPLE

This example demonstrates the operation of a system similar to that illustrated in FIG. 3 employing the nozzle illustrated in FIGS. 4 through 6. The nozzle included a 4.5 inch O.D. housing (35) containing 37 ammonia orifices 0.1175 inch I.D. and 0.25 inch O.D. on one-half inch centers, each of which was centered within 37 acid orifices ⅜ inch in diameter leaving an annular spacing or annular acid orifice between the external surface of the ammonia orifices (38) extended approximately ¼ inch downwardly below the lower plate 46 of housing 35. This assembly was surrounded by 12 evenly spaced circumferential ammonia jets comprising 0.180 inch I.D. stainless steel tubing positioned to eject ammonia radially inwardly into the acid-ammonia spray created by internal ammonia jets 38 and acid orifices 40. The ammonia discharge ends of circumferential ammonia jets 39 were positioned approximately 1 ¼ inch below the lower extremity of ammonia orifices 38.

The radial ammonia jets in turn were surrounded by a cylindrical baffle or shroud four inches in length axially aligned with nozzle housing 35 to provide a turbulent gas mixing zone immediately below the nozzle housing. This assemblage was positioned in a substantially vapor tight rectangular vapor housing 3 feet square. The vertical distance between the lower surface 46 of nozzle housing 35 and the upper surface of quench 20 was approximately 5 feet.

A wet-process acid containing about 10 weight percent incident metallic impurities and 67 weight percent $P_2O_5$ having an $H_2O/P_2O_5$ ratio of 2.7 was passed to nozzle 9 at a temperature of about 135° F. and a rate of about 12 gallons per minute. Ammonia was injected through all nozzles at a rate corresponding to 6 gallons per minute of liquid ammonia at standard temperature and pressure. This corresponded to a relative ammonia rate of 0.25 weight parts ammonia per weight part $P_2O_5$ and a gas velocity at the ammonia orifices on the order or about 2000 feet per minute.

The quench medium comprised an aqueous solution of mixed ammonium phosphates containing approximately 10 weight percent nitrogen and 34 weight percent phosphorus determined as $P_2O_5$ having a polymeric phosphate concentration of about 73 weight percent. Liquid holdup in the quench zone was approximately 1500 gallons. Recycle ratio and quench temperature were maintained at approximately 20/1 and 150° F., respectively.

The temperature of the dispersed acid phased in the unconfined reaction zone was monitored by inserting a thermo-couple probe through vapor housing 18 into the center of the liquid spray approximately 48 inches below ammonia nozzles 38. These conditions were sufficient to maintain a reaction temperature in excess of 600° F. in the dispersed acid phase.

This operation was continued for approximately 6 hours after which vapor housing 18 was opened to inspect the interior, nozzle 9 and shroud 33 for fouling defects. Both the axial and radial orifices were completely clean of deposits. Minor deposits had formed on the interior surfaces of shroud 33 to a thickness of approximately 1/16 inch which in no way impaired reactor operation. Essentially no deposits were found on the interior walls of vapor housing 18 indicating that either essentially none of the acid spray contacted the housing walls prior to quench, or that the walls of housing 18 were maintained at a sufficiently low temperature to prevent the formation of fouling deposits thereon.

We claim:

1. The method of producing aqueous solutions of mixed ammonium phosphates, of which at least 40 percent of the equivalent $P_2O_5$ is present as polyphosphates, from a phosphoric acid feed of which less than 40 percent of the total $P_2O_5$ is in the form of a member selected from the group consisting of polymerized phosphoric acid, ammonium polyphosphates and combinations thereof, which feed has an $H_2O/P_2O_5$ mole ratio of about 4.5 or less, by spraying said acid from an acid spray means downwardly through an unconfined reaction zone having a minimum internal diameter of about at least 2 feet and a height of at least about 2 feet determined as the distance between said acid spray means and the upper surface of said aqueous quench and into a liquid phase, aqueous quench under conditions sufficient to produce a dispersed liquid acid spray, jetting ammonia radially inwardly into said acid spray in said unconfined reaction zone around the full periphery of said acid spray in a direction and at a velocity having an inward radial vector of at least about 200 feet per second and a mass flow rate of at least about 0.12 weight parts ammonia per weight part acid determined as $P_2O_5$ and further dispersing said acid phase into discontinuous small liquid droplets, surrounding said acid droplets with said ammonia, and reacting said ammonia with said acid to adiabatically heat the unconfined acid droplets to a temperature within the range of about 500° to about 750° F. by the autogenous heat of reaction, increase the polymeric $P_2O_5$ content by an amount corresponding to at least about 10 percent of the total $P_2O_5$ present, and convert said acid to an ammoniated, polymerized melt, of which at least about 40 percent of the phosphate determined as $P_2O_5$ is present as ammonium polyphosphates, within less than about 5 feet of said acid spray means and before said acid spray contents said aqueous quench, and quenching said melt to a temperature of less than about 200° F. by immersion in said aqueous quench.

2. The method of claim 1 wherein said $H_2O/P_2O_5$ mole ratio of said acid feed is about 3.3 or less, and said reaction temperature is at least about 600° F. sufficient to produce a reaction melt product of which at least 55 percent of the $P_2O_5$ is present as polymeric species.

3. The method of claim 1 wherein said acid feed is a wet process acid having and $H_2O/P_2O_5$ molar ratioa of about 3.3 or less, a viscosity of at least about 4000 cp at 80° F. and containing about 2 to about 20 weight percent cogeneric impurities, and said acid is ejected from said spray means at a temperature of about 250° to about 500° F. sufficient to substantially reduce said viscosity.

4. The method of claim 3 wherein said acid feed is heated to said temperature between about 250° and about 500° F. prior to passage to said spray means at least in part by reaction of said feed with ammonia in an amount corresponding to about 0.04 to about 0.1 weight parts ammonia per weight part acid determined as $P_2O_5$.

5. The method of claim 1 wherein said unconfined reaction zone is defined by a substantially gas tight enclosure having an internal diameter of at least about two feet, the upper portion thereof containing said spray means and ammonia jet and the lower portion thereof containing said aqueous quench, the vertical distance between said spray means and the upper surface of said quench being at least about two feet and the ratio of said vertical distance to said internal diameter being less than about 4.

6. The method of claim 5 wherein said ammonia and feed acid are reacted in the substantial absence of air and all of said feed acid and ammonia fed to said unconfined reaction zone, and the reaction products obtained in said zone are absorbed in said aqueous quench.

7. The method of claim 1 wherein said aqueous quench is maintained at a temperature of about 150° F. or less, a pH between about 5.5 and 8.5, and a $P_2O_5$ concentration of less than about 50 weight percent.

8. The method of claim 1 wherein said ammonia jet and said acid spray means are surrounded by a gas directing shroud having a substantially vertical longitudinal axis, being open at its lower end and having a length of about 4 feet or less and a length to minimum internal diameter ratio of about 10 or less.

9. The method of claim 1 wherein said acid feed comprises wet-process acid containing at least 1 weight percent incident metallic impurities comprising compounds of iron, magnesium and aluminum determined as the corresponding oxides.

10. The method of claim 1 wherein said feed acid contains less than 1 weight percent of metallic impurity compounds determined as the corresponding oxides.

11. The method of claim 10 wherein said feed acid consists essentially of white phosphoric acid.

* * * * *